United States Patent [19]
Humphrey

[11] 3,857,715
[45] Dec. 31, 1974

[54] EXTRUSILE HYDRAULIC CEMENT COMPOSITIONS CONTAINING ALKALI AND CARBOHYDRATE

[76] Inventor: Clyde W. Humphrey, 23 E. Elm St., Norwalk, Ohio 44854

[22] Filed: Mar. 1, 1972

[21] Appl. No.: 231,020

[52] U.S. Cl. ............................................... 106/92
[51] Int. Cl............................................. C04b 7/00
[58] Field of Search ..................................... 106/92

[56] References Cited
UNITED STATES PATENTS

| | | | |
|---|---|---|---|
| 157,312 | 12/1874 | Colby et al. | 106/76 |
| 2,418,431 | 4/1947 | Scripture | 106/92 |
| 3,090,692 | 5/1963 | Kelly et al. | 106/92 |
| 3,432,317 | 3/1969 | Kelly et al. | 106/92 |

FOREIGN PATENTS OR APPLICATIONS

| | | |
|---|---|---|
| 538,511 | 3/1957 | Canada |

Primary Examiner—Delbert E. Gantz
Assistant Examiner—S. Berger
Attorney, Agent, or Firm—Theodore J. Dettling

[57] ABSTRACT

A hydraulic cement-containing product is made from a hydraulic cement admixture containing a low concentration of water by employing a hydraulic cement admixture prepared by homogeneously admixing into a dry mix of a hydraulic cement and aggregate, first, an aqueous solution of a water-soluble alkali compound, such as ammonium hydroxide, and then a water-soluble carbohydrate, such as molasses, and water sufficient to provide an admixture that is cohesive and plastic. Because of the low water content of the hydraulic cement admixture, products made therefrom have good ultimate properties and can be made by an extrusion process in addition to the conventional molding process.

10 Claims, No Drawings

EXTRUSILE HYDRAULIC CEMENT COMPOSITIONS CONTAINING ALKALI AND CARBOHYDRATE

BACKGROUND OF THE INVENTION

This invention relates to improved cement products, such as concrete block and pipe, and to a method for their production.

Products or architectural structures made from a hydraulic cement binder and aggregate represent one of the principal uses for hydraulic cement. Customarily such cement products are produced by admixing cement, aggregate, and water, shaping the resulting admixture into a product in a mold or form, and allowing the product in the mold to age for a period of time sufficient to allow the cement to cure to a degree of strength that will permit the product to be removed from the form or mold without damage and be self-supporting. Because of the time interval required to cure such cement products to this state, only a few products can be made per mold per interval of time, and a large volume of products can only be attained by using a plurality of molds. Besides the obvious initial cost of such a plurality of molds, there is the further economic burden imposed by their maintenance, the cost of moving the molds to and away from the cement mixing and pouring location, and finally the cost of removing the cured cement product from the molds.

Additionally it is characteristic of products produced in molds or forms that their surfaces are often marred either by imperfections in the mold or when the mold is imperfectly filled with the cement, aggregate, water admixture. Such surface defects not only detract from the aethestics of the products but also can appreciably weaken their ultimate strength. This depreciation of strength can be especially serious in hollow cement products such as pipe or thin structural load-bearing panels, thus necessitating that they be overdesigned to compensate for this weakness. Additionally in pipe, surface roughness of the inside surface can significantly reduce the volume of water that can be carried by a given size pipe.

SUMMARY OF THE INVENTION

Having in mind these deficiencies and defects of the prior art cement products and structures and the method for their production, it is a principal object of this invention to provide hydraulic cement products and structures and a method for their production that either eliminates or significantly minimizes these deficiencies and defects.

More particularly it is an object of this invention to provide a method of preparing hydraulic cement, aggregate, water admixtures that can be more easily and perfectly shaped in molds to give products having reduced surface blemishes and that in some instances can be more quickly demolded.

A further principal object of this invention is the provision of hydraulic cement-containing products and structures having more perfect surfaces that are produced and shaped by an extrusion process and can in many products obviate the need for molds or forms and their attendant problems and deficiencies.

These and other objects and advantages, which will be apparent to those skilled in the art from the following description, are achieved in cement-containing products and structures produced by a process which comprises in its most elementary embodiment, homogeneously admixing into a hydraulic cement/aggregate dry mix first an aqueous solution of a water-soluble alkali compound such as ammonium hydroxide or sodium hydroxide, and then a water-soluble carbohydrate and water in quantities sufficient to provide an admixture that is cohesive and plastic enough to be formed into a product, forming the admixture into a product, and conditioning the product until the admixture is cured. In the following description this uniquely prepared admixture will be called "cement admixture" for brevity.

DETAILED DESCRIPTION

In the most preferred embodiment of this invention, the hydraulic cement-containing products and structures, hereinafter called "cement products" for brevity, are formed into their ultimate shape by an extrusion process and hence the following description will be directed principally to the parameters governing such a manufacturing process. However, this is not to be construed as limiting this invention, for the process hereinafter described is equally applicable to more conventionally used methods of forming cement products, such as molding or centrifically casting, taking into account the special conditions of cement plasticity and cohesiveness required of these methods as will be readily apparent to those skilled in the art from the following description. In the description and claims that follow all quantities are by weight unless otherwise indicated.

The hydraulic cement, hereinafter called "cement" for brevity, in most general use for the production of cement products is portland cement and is the kind that is typically used in the cement products of this invention. Besides the five types of portland cement most often specified for cement products, viz. Types I, II, III, IV, and V, there can also be used either alone or in admixture therewith in the cement products of this invention, specialty cements such as white or colored portland cement, natural cement, pozzolan cement, slag cement, iron ore cement, bauxite cement, high-alumina cement, and magnesium cement. However, the quantities of products made with these specialty cements is minor compared to the portland cements that constitute the preferred cements used in the products of this invention. The quantity of cement used in the invention cement products is also conventional.

The aggregate employed can be any aggregate customarily used in the production of cement products, which in the majority of products now being made is either sand or sand and gravel. In some specialty products other more esoteric aggregates may be employed in whole or in part, such as inorganic coloring pigments, pozzolans, coal clinkers, fly ash aggregates, limestone, clay, slag, and the like, to impart special properties or reduce cost. The quantities and types of the aggregates used in the invention products are conventional and correspond in the main to those used in cement products made by presently used technology.

The quantity of water employed in the cement admixture of the invention cement products is normally, when maximum strength is desired, the miniumum quantity that will produce a cohesive admixture having sufficient plasticity to permit it to be formed into the desired product shape. This quantity, as will be apparent to those skilled in the art, will be variable and will depend principally on the quantity, moisture content, fineness, and composition of the cement and aggregates used and further on the method to be used in shaping the invention cement product taking into consideration the water supplied by the water-soluble alkali compound. In the preferred extrusion process of this invention it has been observed that the cement-sand admixture hereinafter exemplified for the production of pipe gave optimum processibility and final product strength at a moisture content of 18 percent. Higher or lower optimum moisture content, as for example 15 to 20 percent, would be expected to be required if a different cement-aggregate composition was used and/or a different method, such as molding, of forming the products were to be employed. When an extrusion process is used, the cement admixture normally should be stiff and the water content should not exceed that amount that will make the cement admixture so plastic that the cement product will not be self-supporting before being cured. However, when a supporting form or mandrel is employed to support the product until it has cured to the self-supporting state then, of course, more water could be used in the cement admixture to be extruded if required for optimum processing or ultimate product properties.

Other additives customarily employed in cement products, such as accelerators, retarders, lubricants, air-entraining agents, pozzolanic materials, water-repelling agents, and the like can be used and in conventional quantities, care being exercised to chose only those additives and/or methods of incorporation that are compatible with the cement admixture of this invention, i.e., do not significantly interfere with its plasticity, cohesiveness, fabricating characteristics, and cured properties.

The water-soluble alkali compound can be any sodium, potassium or nitrogen compound that is at least as strongly alkaline as ammonium hydroxide, i.e., has a 0.1 N pH in water of 11.0 or greater, such as sodium hydroxide, sodium carbonate, trisodium phosphate, sodium meta-silicate, potassium hydroxide, ammonium hydroxide and organic amines such as trimethylene diamine, triethylamine, diethylamine, ethylamine, tetramethyammonium hydroxide, piperdine and the like. Such alkali compounds may be used either singly or in combination. Normally such compounds will be used at aqueous concentrations giving a strength equivalent to 26 percent industrial grade ammonium hydroxide, which has been found to give excellent results in the process and products of this invention. While the following description and example will be directed to such ammonium hydroxide, the teachings related thereto are equally applicable and readily extrapolatable to the other types of water-soluble alkali compounds contemplated for use in this invention.

Generally best results are achieved by using the ammonium hydroxide at a 26 percent concentration, but in some cases, such as when the cement-aggregate mixture is low in moisture, it may be desirable to dilute it with water to facilitate homogeneous admixing and dispersion. Ideally, the quantity of ammonium hydroxide used should be that quantity that will uniformly wet-out all of the aggregate and cement to give a damp admixture and that produces a final cement admixture, which after curing, produces cement products of the strength and durability required for the anticipated end use. While the example hereinafter shows the use of 2.3 parts by weight of 26 percent ammonium hydroxide per 100 parts of the cement-aggregate dry mix (containing as-received moisture), smaller or greater quantities may be utilized or be required, as for example, about 1.8 to 3.0 or even more parts, when desired to lessen costs, or to modify the processing and fabricating characteristics and the final physical properties of the cement admixture used in the invention cement products.

The water-soluble carbohydrate employed may, for example, be a starch or sugar such as glucose, sorghum, maltose, lactose, dextrin, corn starch, molasses and the like. If an aqueous dispersion of the carbohydrate is used and it has too high a viscosity or surface tension to readily penetrate and be admixed with the cement aggregate mixture, there may be employed a wetting agent-type surfactant to increase the penetrating power of the aqueous carbohydrate dispersion. particularly preferred is molasses in which there has been incorporated a surfactant that reduces the surface tension of the molasses and enables it to readily penetrate and soak into the cement-aggregate mixture. A surfactant especially suited for this purpose is one derived from the condensation of sorbose and polyethylene oxide sold under the trade name "Liqui-Lass." While normally molasses will be used as the sole binder, when desired, other types of carbohydrate aqueous solutions may be blended therewith to achieve special properties. While about 1.25 parts of carbohydrate solids per 100 parts of the cement-aggregate mixture (containing as-received moisture) have been demonstrated to produce a cement admixture expecially well suited for cement pipe in the following example, lesser or greater amounts, as for example 1.0 up to about 2 or even more parts, may be necessary in other cement products of this invention depending upon the composition, fineness, moisture content, and quantity of the cement, aggregate and so forth employed in the cement admixtures used therein, as will be readily apparent to those skilled in the art, and the optimum amount thereof, for either economy or ultimate properties, can be readily ascertained by experimentation.

In preparing the cement admixture used in the cement products of this invention, the usual order of addition employed consists of first admixing the cement and aggregate together to form a dry mix, then uniformly and homogeneously admixing and dispersing the ammonium hydroxide into this dry mix, then finally water and the water-soluble carbohydrate.

When the water-soluble carbohydrate is in a dry form and is not readily solvated or intimately dispersed during the admixing cycle, then it should be predispersed in some of the water and be added to the admixture as an aqueous dispersion and perferably as a colloidal dispersion or a solution. Generally prior to the addition of the carbohydrate, a portion of the free water (excludes water premixed with the carbohydrate) to be used, such as about one-half, is first added, with the balance being added after the carbohydrate has been uniformly dispersed. When considerable water is used to predisperse the carbohydrate, this two-step addition of free water may not be necessary, or even desirable, it being best to add all of the free water after the carbohydrate addition. Conversely when a dry carbohydrate is used that is readily solvated, then expediency may dictate that it be added either before any or after all of the required water is charged. Generally the best mode of addition of water and carbohydrate will be that method which imparts to the cement admixture the greatest cohesivity and plasticity for the level of carbohydrate used and can be readily ascertained by experimentation for any comtemplated formulation.

While the aggregate is customarily first premixed with the cement before the addition of the ammonium hydroxide, it could, theoretically and if desired, in some instances be admixed with the cement after the cement has first been admixed with the ammonium hydroxide. No advantage is seen for such an order of mixing, however, and it will customarily not be used.

Other cement composition adjuvents or additives, when employed, normally will be added after the admixing of the cement, aggregate, ammonium hydroxide, carbohydrate and water (in part or in toto) except of course when they have been preblended with the cement by the cement manufacturer. Other orders of addition of these adjuvents may at times be equally efficacious or even desirable and can be readily ascertained bearing in mind the caveats hereinbefore set forth with respect to their incorporation into the cement admixture.

In any event, no matter what order of addition of the optional ingredients is determined to be optimum, it is necessary, as in conventional cement products, that all the cement admixture ingredients be homogeneously and uniformly dispersed if the maximum advantages of this invention with respect to the fabricating, aesthetics, and physical properties of the cement products is to be achieved.

After preparation of a homogeneous cement admixture, it can be formed into the desired cement product by any shaping process now customarily employed by industry, such as molding, centrifically casting, and the like or by extrusion as herein described. Because the unique cement admixtures of this invention permit the formation of cement formulations having a higher degree of plasticity then comparable admixtures of similar water content known to the prior art, it is possible to more easily and perfectly form them by conventional molding or forming processes to the desired shapes thus resulting in concrete products having more blemish-free surfaces and in many instances higher densities, factors which can give products having greater strength and durability. To achieve an equivalent plasticity and moldability, conventional concrete admixtures must be significantly increased in their water content thus causing an appreciable decrease in final cured strength.

Of even more significance, however, is the fact that the cement admixture of this invention has sufficient plasticity at water levels giving an excellent final cured strength to permit it to be extruded into a cement product having commercially acceptable final cured properties. In contradistinction presently known cement formulations, if they are to be extruded, required so much water for plasticizing that they do not give commercially acceptable properties or at best give only substandard properties, thus necessitating that they be overdesigned to be acceptable.

This was a completely surprising and unexpected result because the prior art, of which applicant is aware as exemplified by U.S. Pat. No. 2,418,431 and 3,090,692, dogmatically teach that carbohydrates and particularly sugar, if used at a concentration in excess of 0.5 parts per 100 parts of cement, result at worse in products having no substantial compressive strength and at best in products requiring inordinate and completely impractical periods to reach any useful degree of strength. Contrary to these prior art teachings, it has been discovered, as is apparent from the preceding description and the example to follow, that the invention cement admixtures customarily containing about 1.5 parts or more of the watersoluble carbohydrate per 100 parts of the cement, produce cement products having commercially acceptable physical properties in reasonable curing times. About 1 part of the water-soluble carbohydrate binder is about the minimum that can be used if the invention objectives are to be attained.

After shaping, the cement product of this invention is conventionally cured either at ambient conditions or under accelerated conditions of high humidity, e.g., 90+percent relative humidity, and higher than ambient temperatures, e.g., 100° to 212°F. The cure rate will, of course, vary with the cement admixture but generally has been observed to roughly parallel comparable conventional compositions.

In the following example, there is described an apparatus and a mixing procedure that is particularly well adapted to economically and continuously produce concrete products of uniform quality and of excellent strength and durability.

The apparatus used consists of a pilot-plant pug mill mixer having a mixing chamber of 8 foot length and 30 inch diameter in which there is rotating a shaft carrying a plurality of kneading knives pitched to move the material being mixed from the charging end to the exit end. Positioned above the charging end of the pug mill is a hopper for continuously feeding the dry mix of cement and aggregate into the mixer and immediately adjacent downstream thereto a spray nozzle for spraying ammonium hydroxide unto the charged agitated dry mix. Located midway of the mixer length there is positioned thereover a second nozzle and third nozzle for spraying respectively water and an aqueous dispersion of a carbohydrate unto the agitated dry mix.

Near the exit end of the mixing chamber, there is positioned a device, such as a Consisdodyne (Leeds & Northrup), that measures the moisture content of the final admixture, and if deficient in moisture content, actuates a water spray nozzle positioned about 1 foot from the exit end of the mixer that sprays water unto the admixture to bring its moisture content up to a desired level.

Positioned below the exit of the mixer is a hopper feeding a 6 inch laboratory extruder (Bonnot Co. of Kent, Ohio) having a 36 inch long, double-flight screw having decreasing type pitch (low pitch). The extruder is equipped with a 4 inch external diameter pipe die (½ inch wall thickness). When it is desired to extrude larger products and/or at faster rates, then of course larger mixers and extruders can be used.

EXAMPLE

With the mixing knives rotating at a speed that will convey the admixture to the exit end of the mixer in about four to five minutes, a dry mix of 40 pounds of sand and 26 pounds of portland cement was fed from the hopper into the mixer at a rate to give a final volume per unit of time of final cement admixture equal to that being extruded. Concentrated ammonium hydroxide (26 percent) was then sprayed unto the agitating dry mix at a weight ratio of 2.3 parts of the ammonium hydroxide per 100 parts of the dry mix and mixed until uniformly dispersed to give a damp dry mix — about 2 minutes mixing time.

Then blackstrap molasses, heated to 140° F, and containing per ton 8 fluid ounces of a wetting agent surfactant (sorbose polyethylene oxide condensation product), was sprayed unto the ammonium hydroxide-dampened dry mix at a weight ratio of 2.5 parts of molasses per 100 parts of the dry mix. Additionally enough water was simultaneously sprayed to give a cohesive admixture, and the two were mixed until uniformly dispersed — about 1 ½ to 2 minutes.

Water was then sprayed unto the agitating admixture, if required, to give a final cement admixture having about a 18% moisture content. The resulting homogeneous admixture was then fed to the extruder and extruded into 4 inch external diameter pipe having ½ inch side walls. During extrusion a vacuum was applied to reduce the porosity of the cement admixture to give a more dense final product.

The pipe after being cured at ambient conditions exhibited excellent surface smoothness, was dense and very hard, and had higher impact strengths than a comparable pipe made according to the procedures of the prior art.

As is apparent from the preceding description and example, the process of this invention produces cement products having smoother surfaces and higher densities, strength, and durability as compared to like products of similar composition. Additionally because of the low water content that it permits, suitable cement products can now be extruded in contradistinction to the prior art cement compositions where the higher water content required for extrusion gave in the main unacceptable products. Because they can be extruded, it is further possible to deareate the invention cement admixtures contrary to other prior art materials.

What is claimed is:

1. A method for producing a cured hydraulic cement-containing product which comprises:
    A. admixing into a mix containing a hydraulic cement,
        1. first, an aqueous solution of a water-soluble alkali compound selected from the class consisting of a sodium compound, potassium compound, and nitrogen compound that has a 0.1NpH in water of 11.0 or greater, and
        2. then, water-soluble carbohydrate and water in quantities sufficient to provide an admixture that is cohesive and can be formed into a product, the quantity of said water-soluble carbohydrate being at least about 1 part per 100 parts of the hydraulic cement;
    B. forming the admixture into the product by an extrusion process; and
    C. conditioning the product until the admixture is cured.

2. The method of claim 1 wherein the alkali compound is potassium hydroxide, sodium hydroxide, ammonium hydroxide or mixtures thereof.

3. The method of claim 1 wherein the carbohydrate is a sugar, a starch, or mixtures thereof.

4. The method of claim 3 wherein the carbohydrate is added as an aqueous solution and the solution contains a surfactant that reduces the surface tension of the carbohydrate solution.

5. The method of claim 1 wherein the carbohydrate is a sugar and the alkali compound is ammonium hydroxide.

6. The method of claim 1 wherein the carbohydrate is molasses and the alkali compound is ammonium hydroxide.

7. The method of claim 6 wherein the molasses contains a surfactant that reduces the surface tension of the molasses.

8. The method of claim 7 wherein the molasses is used in a quantity that supplies at least about 1.0 parts of sugar solids per 100 parts of the hydraulic cement.

9. The method of claim 1 wherein the carbohydrate is a starch.

10. The method of claim 1 wherein the carbohydrate is a sugar.

* * * * *